(12) United States Patent
Gao et al.

(10) Patent No.: US 9,038,045 B2
(45) Date of Patent: May 19, 2015

(54) UNIFIED PARALLEL C WORK-SHARING LOOP CONSTRUCT TRANSFORMATION

(75) Inventors: Yaoqing Gao, Markham (CA); Liangxiao Hu, Markham (CA); Raul Esteban Silvera, Markham (CA); Ettore Tiotto, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 431 days.

(21) Appl. No.: 13/296,705

(22) Filed: Nov. 15, 2011

(65) Prior Publication Data
US 2013/0125105 A1 May 16, 2013

(51) Int. Cl.
*G06F 9/45* (2006.01)
*G06F 9/44* (2006.01)

(52) U.S. Cl.
CPC . *G06F 8/51* (2013.01); *G06F 8/314* (2013.01)

(58) Field of Classification Search
CPC ............. G06F 8/45; G06F 8/51; G06F 8/443; G06F 8/452
USPC ........................................................ 717/160
See application file for complete search history.

(56) References Cited

U.S. PATENT DOCUMENTS

2005/0028141 A1* 2/2005 Kurhekar et al. ............. 717/119
2012/0159458 A1* 6/2012 Levanoni et al. ............. 717/136

OTHER PUBLICATIONS

Christopher Mark Barton, (Improving Access to Shared Data in a Partitioned Global Address Space Programming Model (2009)).*
Francois Cantonnet, et al., Performance Monitoring and Evaluation of a UPC Implementation on a NUMA Architecture, Proceedings on the International Parallel and Distributed Processing Symposium, Jul. 28, 2003, pp. 1-8 (plus 1 citation page), IEEE, Published on the World Wide Web at: ftp://ftp.cs.umanitoba.ca/pub/IPDPS03/DATA/W18_PMEO_02.PDF.
Wei-Yu Chen, et al., A Performance Analysis of the Berkeley UPC Compiler, Proceedings of the 17th Annual International Conference on Supercomputing, Jun. 23, 2003, pp. 1-11, Association for Computing Machinery—ACM, Published on the World Wide Web at: http://www.gwu.edu/~upc/publications/performance.pdf.
Wei-Yu Chen, Building a Source-to-Source UPC-to-C Translator, Technical Report, Dec. 2004, pp. 1-36 (plus 1 citation page), Department of Electrical Engineering and Computer Sciences, University of California at Berkeley, Published on the World Wide Web at: http://www.eecs.berkeley.edu/Pubs/TechRpts/2004/CSD-04-1369.pdf.

(Continued)

*Primary Examiner* — Li B Zhen
*Assistant Examiner* — Hui-Wen Lin
(74) *Attorney, Agent, or Firm* — Lee Law, PLLC; Christopher B. Lee

(57) ABSTRACT

Control flow information and data flow information associated with a program containing a upc_forall loop are built. A shared reference map data structure using the control flow information and the data flow information is created. All local shared accesses are hashed to facilitate a constant access stride after being rewritten. All local shared references in a hash entry having a longest list are privatized. The upc_forall loop is rewritten into a for loop. Responsive to a determination that an unprocessed upc_forall loop does not exist, dead store elimination is run. The control flow information and the data flow information associated with the program containing the for loop is rebuilt.

20 Claims, 5 Drawing Sheets

(56) References Cited

OTHER PUBLICATIONS

Author Unknown, HP UPC/HP SHMEM User's Guide, Oct. 2009, pp. 1-15, Hewlett-Packard Development Company, L.P., Published on the World Wide Web at: http://h21007.www2.hp.com/portal/download/files/unprot/UPC/Docs/V3.2/UPC_V32_Users_Guide.pdf.

Author Unknown, Implementing a Scalable Parallel Reduction in Unified Parallel C, Article, May 2010, pp. 1-5, International Business Machines Corporation, Published on the World Wide Web at: http://www.ibm.com/developerworks/rational/cafe/docBodyAttachments/3465-102-1-7226/UPC%20article.pdf.

Christopher Mark Barton, Improving Access to Shared Data in a Partitioned Global Address Space Programming Model, Thesis, Spring 2009, pp. 1-203, Department of Computing Science, University of Alberta, Edmonton, Alberta, Canada.

Ken Kennedy, et al., Efficient Address Generation for Block-Cyclic Distributions, Proceedings of the 9th ACM International Conference on Supercomputing, Dec. 1994, pp. 1-19, Association for Computing Machinery, New York, NY.

Ken Kennedy, et al., A Linear-Time Algorithm for Computing the Memory Access Sequence in Data-Parallel Programs, Proceedings of the 5th ACM Symposium on Principles and Practice of Parallel Programming, Oct. 1994, pp. 1-17, Association for Computing Machinery, New York, NY.

* cited by examiner

Loop transformation system
400

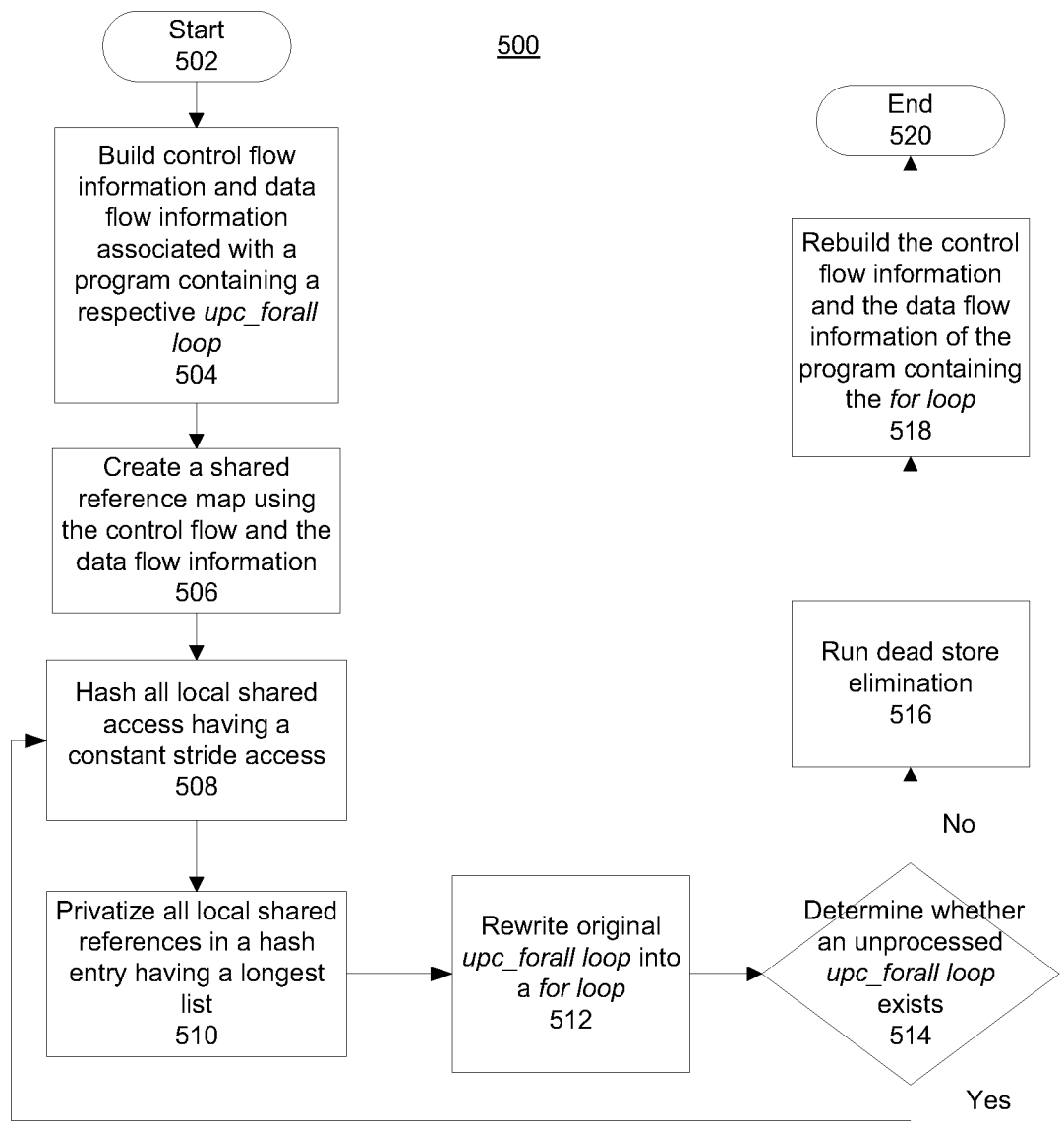

UNIFIED PARALLEL C WORK-SHARING LOOP CONSTRUCT TRANSFORMATION

STATEMENT REGARDING FEDERALLY-SPONSORED RESEARCH OR DEVELOPMENT

This invention was made with Government support under HR0011-07-9-0002 awarded by the PERCS Phase III Program of the Defense Advanced Research Projects Agency (DARPA) of the United States of America. The Government has certain rights to this invention.

BACKGROUND

This disclosure relates generally to loop processing in a data processing system and more specifically to transformation of a Unified Parallel C (UPC) programming language "for all" loop ("upc_forall" loop) in the data processing system.

Unified Parallel C (UPC) programming language is an explicit parallel extension to the standard C programming language, which enables concurrent execution of a program by multiple hardware threads. The UPC language adopts a single program multiple data (SPMD) programming model. In the SPMD model, every thread executes the same program and every running thread executes every program statement concurrently.

The UPC language also adheres to a partitioned global address space programming model (PGAS). In a PGAS program, certain data structures (for example, shared arrays) are globally visible to all threads and are physically allocated across all available memory in a cluster. The UPC language specification allows shared arrays to be distributed in blocks of one or more contiguous elements across each compute node in the cluster.

The UPC memory space available to a thread is divided into private and shared portions. Each UPC thread has exclusive access to its own private memory space, and has access to the entire shared memory space. The shared memory space is logically subdivided into a number of partitions, which are physically allocated in the memory space of each thread. A thread is said to have "affinity" to the portion of the shared memory space physically allocated in the memory space that belongs to that thread.

BRIEF SUMMARY

A computer-implemented process for upc_forall loop transformation involves building control flow information and data flow information associated with a program containing a upc_forall loop; creating a shared reference map using the control flow information and the data flow information; hashing all local shared accesses to facilitate a constant access stride after being rewritten; privatizing all local shared references in a hash entry with a longest list; rewriting the upc_forall loop into a for loop; responsive to a determination that an unprocessed upc_forall loop does not exist, running dead store elimination; and rebuilding the control flow information and the data flow information associated with the program containing the for loop.

A computer program product for upc_forall loop transformation includes a computer recordable-type media containing computer executable program code stored thereon, where the computer executable program code when executed on a computer causes the computer to build control flow information and data flow information associated with a program containing a upc_forall loop; create a shared reference map data structure using the control flow information and the data flow information; hash all local shared accesses to facilitate a constant access stride after being rewritten; privatize all local shared references in a hash entry with a longest list; rewrite the upc_forall loop into a for loop; responsive to a determination that an unprocessed upc_forall loop does not exist, run dead store elimination; and rebuild the control flow information and the data flow information associated with the program containing the for loop.

An apparatus for upc_forall loop transformation includes a communications fabric, a memory connected to the communications fabric, where the memory stores computer executable program code, a communications unit connected to the communications fabric, an input/output unit connected to the communications fabric, a display connected to the communications fabric, and a processor unit connected to the communications fabric. The processor unit executes the computer executable program code to direct the apparatus to build control flow information and data flow information associated with a program containing a upc_forall loop; create a shared reference map using the control flow information and the data flow information; hash all local shared accesses to facilitate a constant access stride after being rewritten; privatize all local shared references in a hash entry with a longest list; rewrite the upc_forall loop into a for loop; responsive to a determination that an unprocessed upc_forall loop does not exist, run dead store elimination; and rebuild the control flow information and the data flow information associated with the program containing the for loop.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 5 is a flowchart of an example of an implementation of a upc_forall loop transformation process using the loop transformation system of FIG. 4, in accordance with illustrative embodiments of the present subject matter.

DETAILED DESCRIPTION

Although an illustrative implementation of one or more embodiments is provided below, the present subject matter may be implemented using any number of techniques. This disclosure should in no way be limited to the illustrative implementations, drawings, and techniques illustrated below, including the example designs and implementations illustrated and described herein, but may be modified within the scope of the appended claims along with their full scope of equivalents.

Figure 1:
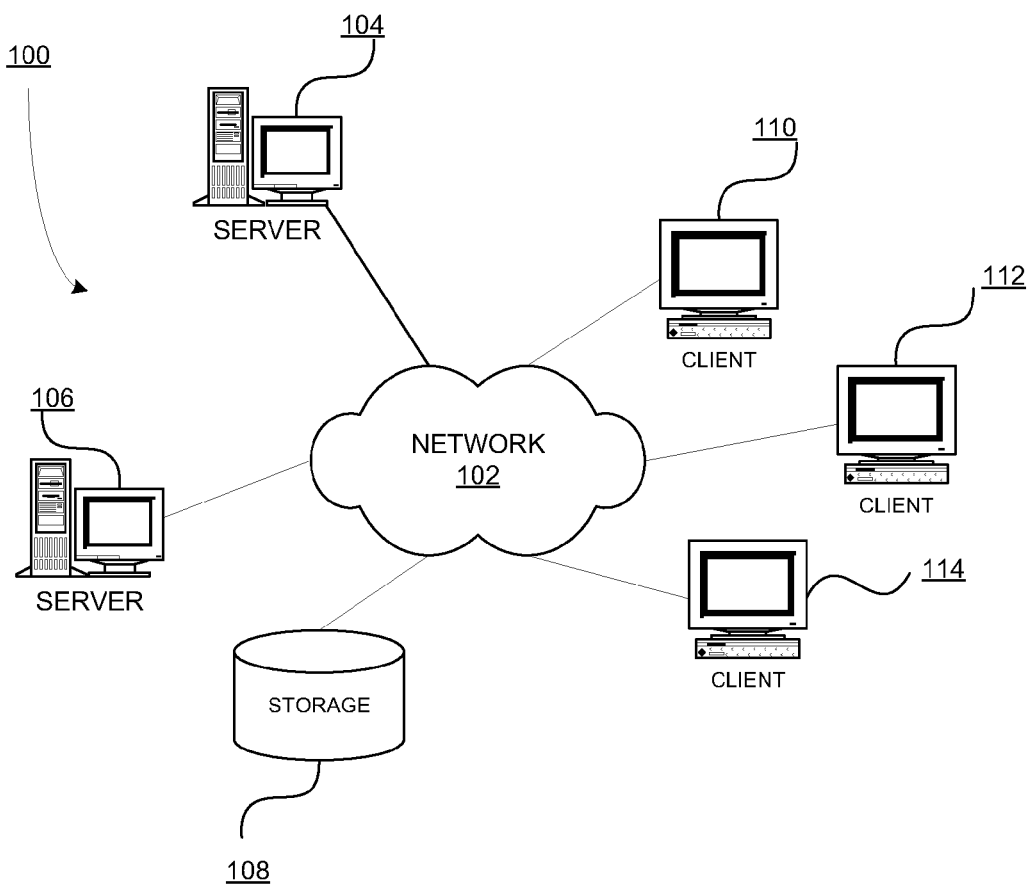
FIG. 1 is a block diagram of an example of an implementation of a network of data processing systems in which the present subject matter may be implemented.
Figure 2:
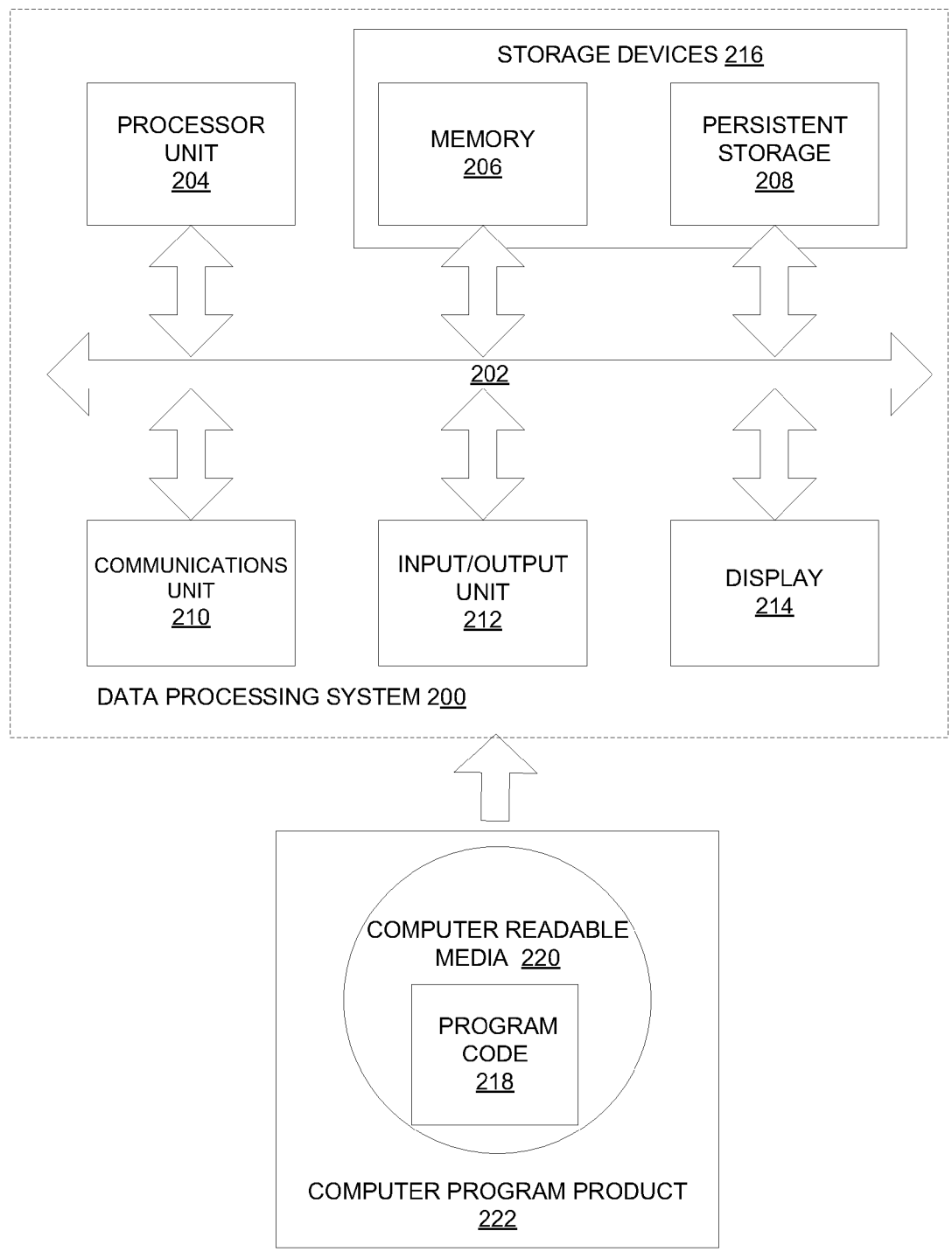
FIG. 2 is a block diagram of an example of an implementation of a data processing system in which the present subject matter may be implemented.

With reference now to the figures and in particular with reference to FIG. 1 and FIG. 2, diagrams of example data processing environments are provided in which illustrative embodiments may be implemented. It should be appreciated that FIG. 1 and FIG. 2 are only examples and are not intended to assert or imply any limitation with regard to the environments in which different embodiments of the present subject matter may be implemented. Many modifications to the depicted environments may be made without departure from the scope of the present subject matter.

Figure 3:
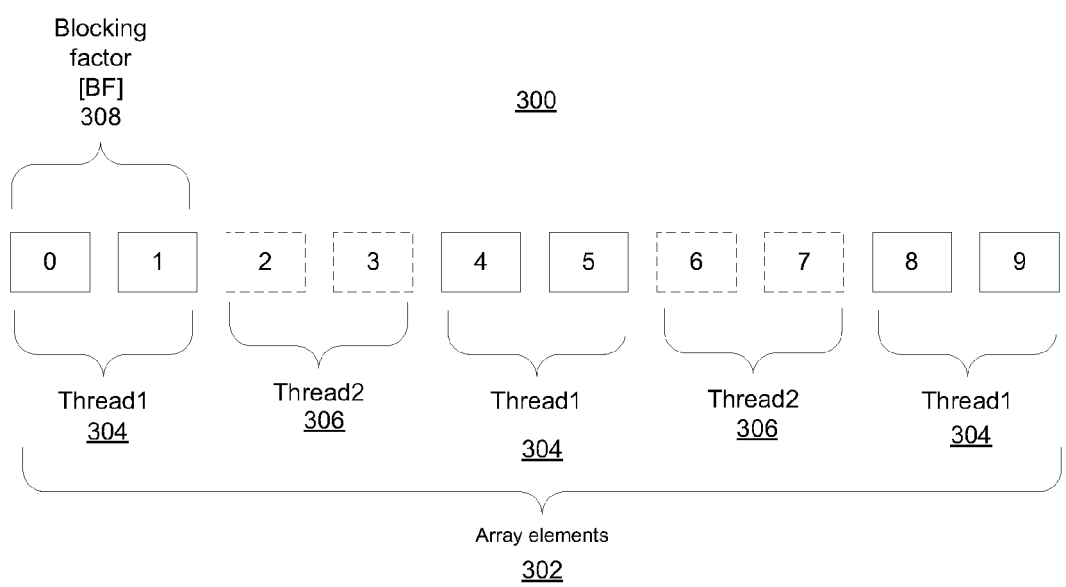
FIG. 3 is a block diagram representation of a data layout of a shared array, in accordance with illustrative embodiments of the present subject matter.

With reference to FIG. 3, a block diagram representation of a data layout of a shared array 300 is presented. The array 300 is a representation of a shared array. A shared array may be created by an array declaration, such as "shared [BF] Type A[ARR_SIZE]," which creates an array of "ARR_SIZE" elements distributed in blocks of block factor (BF) elements across all threads. The "shared" qualifier is used to declare a shared array. The optional blocking factor "[BF]" is used to distribute "ARR_SIZE" elements in blocks of size block factor (BF) consecutive elements across the entire shared memory space. The array 300 of FIG. 3 represents the data layout for a shared array defined using a block factor of two (BF=2), array size of ten (ARR_SIZE=10), and a number of threads equal to two (THREADS=2) with elements of type integer (int) (shared [2] int A[10]). The shared array A 302, includes a set of ten (10) elements, corresponding to the specification of array size ten (ARR_SIZE=10). The blocking factor 308, [BF], is specified as two (BF=2) and defines five (5) sets of two consecutive array elements, 304 and 306, distributed with affinity to each of these two (2) threads (Thread 1 and Thread 2 as defined by the specification of THREADS=2). Each array element in this example has integer type (int) and a size of integer bytes (sizeof(int) bytes).

Similarly to the C programming language, the UPC programming language allows traditional C-style pointers to point to an element of a local array. In addition, UPC introduces a new type of pointer (pointer-to-shared) that is used to point to elements of a shared array. A UPC pointer-to-shared may reference locations in the shared space, while a regular C-style pointer (private pointer) may reference only addresses in the private memory space of a thread.

When a UPC private pointer-to-shared is used to access shared objects that have affinity to the thread issuing the access identifier (MYTHREAD), no communication with other threads (e.g., remote communication) is necessary to carry out the access. This type of access is a local shared access. Conversely remote communication is required to access the portion of a shared array that does not have affinity to the thread executing the access. This type of access is a remote shared access.

The latency of a local shared access may be considerably lower, by orders of magnitude, than the latency of a remote shared access. Therefore, to improve the performance in a UPC program, the number of remote shared accesses performed by the program should be minimized when possible.

Because the UPC language adheres to the single program multiple data (SPMD) programming model, a "for loop" language statement within the UPC code is executed by every thread. Accordingly, each iteration of a for loop is concurrently executed by all threads. Therefore, for loops are not well suited to the task of partitioning work in a loop between threads. To address this issue, the UPC language provides an alternative loop construct in the form of a "upc_forall loop."

Unlike a regular for loop construct, the upc_forall loop is a work-sharing construct enabling the assignment of a subset of the total number of loop iterations to each thread. The upc_forall loop construct is syntactically similar to a C-language for loop with the addition of a fourth clause/parameter, defined as an "affinity clause," that is evaluated by each thread to determine whether the thread is designated to execute the current loop iteration. For example, in the following example pseudo code snippet:

```
shared [BF] int array[N];
 ...
upc_forall (int i=0; i < N; ++i; &array[i]) { A[i] = MYTHREAD; }
```

The fourth clause of the upc_forall loop statement, "&array[i]," is evaluated by all threads to determine which thread will execute the iteration represented by the lower-case loop control variable "i" (e.g., the "ith" iteration) of the loop. A thread "T" satisfying the equality specified as "upc_threadof(&A[i])==MYTHREAD" executes the "ith" iteration of the loop. The upc_forall loop construct may be used to enforce an owner-compute rule by which a thread having affinity (that "owns") the element "A[i]" executes the "ith" iteration of the loop.

The affinity expression of a upc_forall loop may be analyzed to determine whether the shared accesses present in the loop body are shared local accesses in the entire loop iteration space (or for a subset of the iteration space). A upc_forall loop may be transformed to improve runtime performance. Using the following pseudo syntax of a upc_forall loop as an example:

```
shared [BF] T A[ARR_SIZE]
upc_forall(int i=0; i < ARR_SIZE; i++; &A[i]){
    A[i] ...
}
``` the upc_forall loop may be transformed into an optimized loop nest as presented in the following example pseudo code snippet:

```
local_ptr =_get_array_base_address(A); // return the starting address of
local portion of array A on each node
for (int i=BF*MYTHREAD; i<ARR_SIZE; i+=BF)
    for (int j=i; j < i+BF; j++){
        local_ptr[[((j % ( THREADS)) % ThreadsPerNode) *
            local_size_on_each_thread + (( i % BF) *
            array_element_size + (j /(
            THREADS)) * BF * array_element_size)]] ...
}
```

Where:
  local_ptr is the starting address of the local portion of array A on each node;
  ThreadsPerNode is the number of threads collocated on the same node;
  local_size_on_each_thread is the size in bytes of the local portion of array A; and
  array_element_size is the size in bytes of an element of array A.

When the loop nest optimization illustrated above is not used, the upc_forall loop may be transformed into a for loop by inserting the condition "(upc_threadof(&A[i])==MYTHREAD)" around the loop body. This condition may then be evaluated by all execution threads on each loop iteration, adding overhead to the loop execution. This translation scheme would lead to inefficient scalability because the cost of the affinity check may be amortized by the execution cost of the body only (ARR_SIZE/THREADS) times on average.

In addition, the scheme employed to translate accesses to shared arrays in the loop (e.g., A[i]=MYTHREAD) has an impact on the application runtime performance. In the example provided above, every indexed reference (A[i]) is a shared local access which may be optimized by addressing a thread-owned memory space directly rather than using an indirect approach involving calling an appropriate routine exposed by a partitioned global address space (PGAS) programming model runtime system.

Moreover, consecutive accesses performed by the same thread to an array index (A[i]) have a physical distance in memory equal to the size of the referenced element (sizeof(A[i])). This property, which may be referred to as "stride one accessing distance," is not immediately apparent once the indexed shared access (A[i]) is optimized or translated into a runtime call.

It should be noted that conception of the present subject matter resulted from recognition of certain limitations associated with existing techniques for loop transformation. For example, it was recognized that proposed schemes of address generation for block cyclic distribution in high performance Fortran, which may be applied to a upc_forall loop, have several drawbacks. Example drawbacks that were recognized include in one example, a runtime approach, in which complicated loops are used to perform a set of pre-calculations containing expensive division (/), modulo (%) and multiplication (*) operations. It was recognized that in another example of a table look-up approach, two tables are required for each array, and therefore as the number of shared arrays in a UPC program increases, a potential for an increasing memory requirement would occur. It was additionally recognized that in both approaches, the original loop is rewritten to a loop with at least two more if-statements, which typically inhibits other loop-related optimization. It was further recognized in another example, that the access stride is no longer constant after the loop is rewritten, which creates an additional factor that inhibits further loop-related optimization. The present subject matter improves loop transformation while retaining the ability to apply loop optimizations and without the several observed drawbacks to prior solutions. As such, improved loop transformation may be obtained based upon the Unified Parallel C work-sharing loop construct transformation described herein.

FIG. 1 is a block diagram of an example of an implementation of a network of data processing systems 100 in which the present subject matter may be implemented. The network data processing system 100 includes a network of computers. Network data processing system 100 includes a network 102, which is the medium used to provide communications links between various devices and computers connected together within the network data processing system 100. The network 102 may include connections, such as wire, wireless communication links, or fiber optic cables.

In the depicted example, a server 104 and a server 106 connect to the network 102 along with a storage unit 108. In addition, client computing devices (clients) 110, 112, and 114 connect to the network 102. The clients 110, 112, and 114 may be, for example, personal computers or network computers. In the depicted example, the server 104 provides data, such as boot files, operating system images, and applications to the clients 110, 112, and 114. The clients 110, 112, and 114 are clients to the server 104 and the server 106 in this example. The network data processing system 100 may include additional servers, clients, and other devices not shown.

In the depicted example, the network data processing system 100 may include the Internet with the network 102 representing a worldwide collection of networks and gateways that use the transmission control protocol/Internet protocol (TCP/IP) suite of protocols to communicate with one another or other protocols as appropriate for a given implementation. At the heart of the Internet is a backbone of high-speed data communication lines between major nodes or host computers, including thousands of commercial, governmental, educational and other computer systems that route data and messages. The network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is a block diagram of an example of an implementation of a data processing system 200 operable for various embodiments of the present subject matter. In this illustrative example, the data processing system 200 includes communications fabric 202 that provides communications between a processor unit 204, a memory 206, a persistent storage 208, a communications unit 210, an input/output (I/O) unit 212, and a display 214.

The processor unit 204 serves to execute instructions for software that may be loaded into the memory 206. The processor unit 204 may be a set of one or more processors or may be a multi-processor core, depending on the particular implementation. Further, the processor unit 204 may be implemented using one or more heterogeneous processor systems in which a main processor is present with secondary processors on a single chip. As another illustrative example, the processor unit 204 may be a symmetric multi-processor system including multiple processors of the same or different type.

The memory 206 and the persistent storage 208 are examples of storage devices 216. A storage device includes any piece of hardware that is capable of storing information, such as, for example without limitation, data, program code in functional and/or executable form, and/or other suitable information either on a temporary basis and/or a permanent basis. The memory 206, in these examples, may be for example, a random access memory (RAM) or read-only memory (ROM), or any other suitable volatile or non-volatile storage device. The persistent storage 208 may take various forms depending on the particular implementation. The persistent storage 208 may include one or more components or devices. For example, the persistent storage 208 may be a hard drive, a flash memory, a rewritable optical disk, a rewritable magnetic tape, or some combination of the above. The media used by the persistent storage 208 also may be removable. A removable hard drive may be used for the persistent storage 208.

The communications unit 210, in these examples, provides for communications with other data processing systems or devices. In these examples, the communications unit 210 is a network interface card. The communications unit 210 may provide communications through the use of either or both physical and wireless communications links.

The input/output unit 212 allows for input and output of data with other devices that may be connected to the data processing system 200. For example, the input/output unit 212 may provide a connection for user input through a keyboard, a mouse, and/or some other suitable input device. Further, the input/output unit 212 may send output to a printer or other device. The display 214 provides a mechanism to display information to a user.

Instructions for an operating system, applications, and/or programs may be located in the storage devices 216, which are in communication with the processor unit 204 through the communications fabric 202. In these illustrative examples, the instructions are in a functional executable form on the persistent storage 208. These instructions may be loaded into the memory 206 for execution by the processor unit 204. The processes of the different embodiments may be performed by the processor unit 204 using computer-implemented instructions, which may be located in a memory, such as the memory 206.

These instructions are referred to as program code, computer usable program code, or computer readable program code that may be read from storage and executed by a processor in the processor unit 204. The program code in the different embodiments may be embodied (e.g., recorded) on different physical or tangible computer readable storage media, such as the memory 206 or the persistent storage 208.

Program code 218 is stored/recorded in a functional executable form on a computer readable storage media 220 that is optionally removable and may be loaded onto or transferred to the data processing system 200 for storage and execution by the processor unit 204. The program code 218 and the computer readable storage media 220 form a computer program product 222 within these examples. In one example, the computer readable media 220 may be in a tangible form, such as, for example, an optical or magnetic disc that is inserted or placed into a drive or other device that is part of the persistent storage 208 for transfer and storage onto a storage device, such as a hard drive that is part of the persistent storage 208. In a tangible form, the computer readable storage media 220 also may take the form of a persistent storage device, such as a hard drive, a thumb drive, or a flash memory that is connected to the data processing system 200. The tangible form of the computer readable storage media 220 may also referred to as computer recordable storage or recorded media or a computer recordable storage or recorded medium. In some instances, the computer readable storage media 220 may not be removable.

Alternatively, the program code 218 may be transferred to the data processing system 200 from the computer readable storage media 220 through a communications link to the communications unit 210 and/or through a connection to the input/output unit 212. The communications link and/or the connection may be physical or wireless in the illustrative examples.

In some implementations, the program code 218 may be downloaded over a network and stored to the persistent storage 208 from another device or data processing system for use within the data processing system 200. For instance, program code stored in a computer readable storage medium in a server data processing system may be downloaded over a network from the server and stored to the data processing system 200 for execution. The data processing system providing the program code 218 may be a server computer, a client computer, or some other device capable of storing and transmitting the program code 218.

Using the data processing system 200 of FIG. 2 as an example, a computer-implemented process for upc_forall loop transformation using the processor unit 204 builds control flow information and data flow information associated with a program containing a respective upc_forall loop, creates a shared reference map data structure in the storage devices 216 using the control flow information and the data flow information, and hashes all local shared accesses so that they have a constant access stride after rewritten. The processor unit 204 further privatizes all local shared references in a hash entry having a longest list and rewrites the respective upc_forall loop into a for loop. Responsive to a determination that an unprocessed upc_forall loop does not exist, the processor unit 204 runs dead store elimination and rebuilds the control flow information and the data flow information associated with the program that includes the for loop. The transformation of a respective upc_forall loop into a for loop includes transforming local shared array accesses into local accesses via local pointers.

The computer-implemented process for transformation of a upc_forall loop into a for loop including transforming local shared array accesses into local accesses via local pointers, in an example implementation of the disclosure, yields a resulting loop structure free of control flow, with a constant stride, and typically enables normalization that accordingly enables implementation of a set of loop transformation optimizations. Using the process of an implementation of the disclosure, a transformed (strip-mined) upc_forall loop is generated in which the loop induction variable has a constant stride and a generated loop induction variable that traverses a physical layout of a shared array rather than an original (logical) layout.

An enhanced compiler, in an example implementation, is a single pass compiler that does not require multiple compiler front-end passes as in previous attempted solutions. The translation of a upc_forall loop construct, in an example implementation, remaps the original loop iteration space from a logical (original) sequence to a constant stride sequence that follows a physical layout of a block-cyclic shared array to expose a constant stride access pattern that would otherwise be hidden once shared local array accesses are privatized. An example implementation transforms the upc_forall loop and remaps the loop iteration space in such a way that after privatization of a shared array access included in the upc_forall loop, an index expression used to access the privatize shared local array is a loop induction variable that exposes the constant stride property of the access that would otherwise be hidden when the transformed upc_forall loop iterates using the original loop induction variable. Using the process of an example implementation, local shared accesses may have the same performance as private accesses. The privatizing of shared array access in a parallel reduction loop may further improve the performance of that loop.

In an alternative example, the program code 218 that includes the computer-implemented process may be stored within the computer readable storage media 220 as the computer program product 222. In another illustrative example, the process for upc_forall loop transformation may be implemented in an apparatus including a communications fabric, a memory connected to the communications fabric, where the memory includes computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process of upc_forall loop transformation.

Implementations of the disclosed process may enable performance and scalability improvement of a UPC program by transforming upc_forall loop into a for loop, in which local shared array accesses with the same characteristics in the respective loop are transformed into local accesses via local pointers. The following terms are used in the examples that follow: "T" refers to a type; "A" refers to a shared array; "BF" refers to the shared array blocking factor; "i" or "OLDCIV" is an original array index referring to an old (original) loop induction variable; "ni" refers to a new loop induction variable, "L" refers to an array dimension; "M" refers to a second array dimension; "N" refers to a third array dimension; "LB"

refers to a loop lower bound; "UB" refers to a loop upper bound; and "NEWUB" refers to a new loop upper bound.

For example, the previous first example loop may be transformed using the disclosed process into a for loop as shown in the following example pseudo code snippet:

```
T * localPtr = (T *) &A[BF*MYTHREAD];
int NEWUB = ...
for (int ni=0; ni<NEWUB; ni++){
    i= ni + MYTHREAD * BF + ni / BF * BF * (THREADS -1)
    localPtr[ni]...
}
```

The present subject matter does not require complicated pre-calculation, does not produce an if-statement inside a transformed loop, and the array access stride is constant after the loop is rewritten, which collectively enable use of other loop optimizations. The present subject matter transforms a nested loop structure, where the controlling upc_forall loop may be located at any nesting level. The present subject matter privatizes all local shared references with the same characteristics inside the upc_forall loop body. The present subject matter calculates a new loop bound and the original induction variable.

As shown in the following examples, an embodiment of the disclosed process rewrites the upc_forall loop to a for loop, local shared array accesses that have the same characteristics in this loop are also rewritten into local accesses via local pointers, while other local or shared access remain untouched.

For example, the following pseudo syntax that represents a generic upc_forall loop:

```
shared [BF] T A[L][M][N];
for (int i=0; i<L; i++)
    upc_forall(int j=0; j<M; j++; &A[i][j][0])
        for (int k=0; k < N; k++)
            A[i][j][k] ... // original shared local array access
``` is rewritten as:

```
T * local_ptr = (T *) ((shared [BF] T *) &A + BF * MYTHREAD);
for (int i=0; i<L; i++) {
    T1 = i * M *N;
    LB=ComputNewBound(i*M*N, BF, N);
    UB=ComputeNewBound((i+1)*M*N, BF, N);
    for (int lj=LB; lj<UB; lj++) {
        T2 = lj * N;
        j=ComputeOldCIV(T2, BF, N, T1);
        for (int k=0; k < N; k++)
            local_ptr[T2+k]....    // privatized array with simple index
                                   // (affine expression of induction
                                   //  variables k and lj)
    }
}
```

The previous examples of the present subject matter illustrate that no additional loop is introduced, and that the index into the generated local array access is an affine expression of the loop nest induction variable. The generated affine expression causes the array access stride to be constant.

The upc_forall loop may be placed at any nesting level in the loop nest, and loop optimizations, such as simdization and data prefetching, may be applied to the loop structure created using the present subject matter. Single Instruction Multiple Data (SIMD) vectorization (referred to as simdization) is a technique that may be implemented in compilers, and supports multiple programming languages and multiple target machines.

Figure 4:
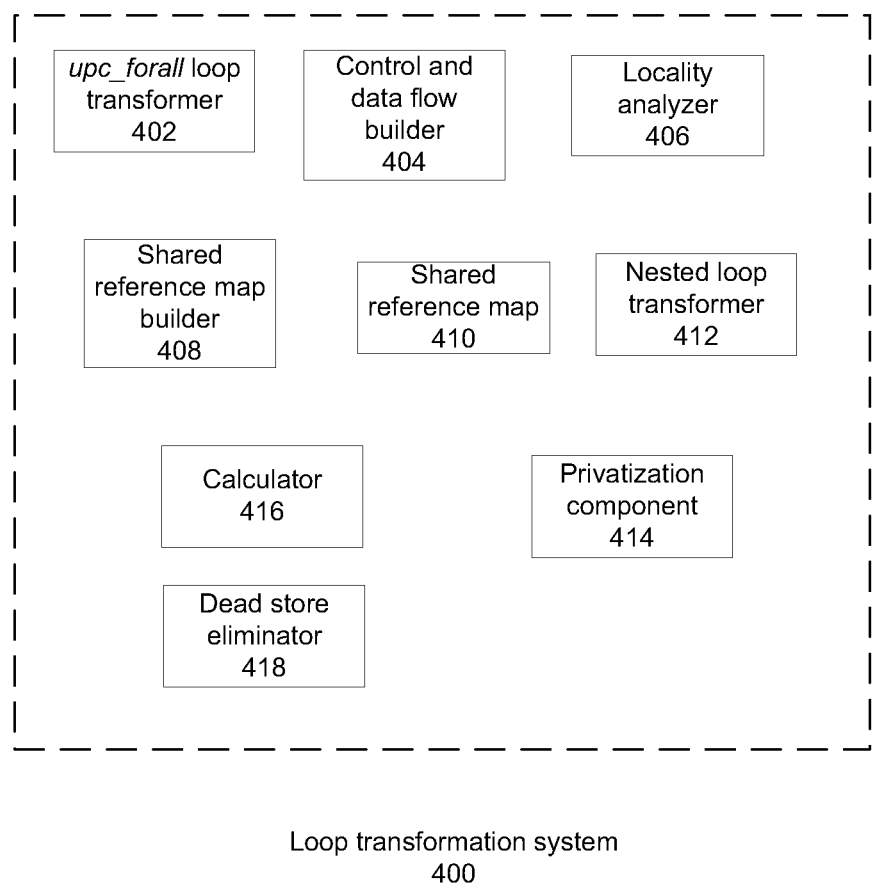
FIG. 4 is a block diagram of an example of an implementation of a loop transformation system, in accordance with illustrative embodiments of the present subject matter.

FIG. 4 is a block diagram of an example of an implementation of a loop transformation system 400. The loop transformation system 400 leverages support of an underlying data processing system, such as the data processing system 200 of FIG. 2 or a network data processing system such as the network data processing system 100 of FIG. 1. The loop transformation system 400 includes a number of components that may be implemented as discrete functional elements or combinations of elements without departing from the scope of the present subject matter. Components of the loop transformation system 400 include elements such as, but not limited to, a upc_forall loop transformer 402, a control and data flow builder 404, a locality analyzer 406, a shared reference map builder 408, a shared reference map 410, a nested loop transformer 412, a privatization component 414, a calculator 416, and a dead store eliminator 418. The nested loop transformer 412 may be implemented as a functional component of the upc_forall loop transformer 402.

The upc_forall loop transformer 402 provides a capability of transforming a respective upc_forall loop into a for loop with characteristics including no additional loop introduced, no required complicated computation overhead inside the loop, and access stride that is still constant. The transformed upc_forall loop may be at any nested level and loop related optimization may be applied after the loop is rewritten.

The control and data flow builder 404 provides a capability to create control flow information and data flow information associated with a program containing a upc_forall loop of interest and a corresponding transformed loop. Control flow information and data flow information for the program is built before the loop is rewritten and again after the loop is rewritten to ensure correctness.

The locality analyzer 406 provides a capability of determining locality information associated with all shared access elements. The shared reference map builder 408 uses the locality information associated with all shared access elements to create the shared reference map 410.

The nested loop transformer 412, which may be contained within the upc_forall loop transformer 402 as described above, provides a capability to transform a nested loop structure, where the upc_forall loop may be at any nested level. The privatization component 414 provides a capability to privatize local shared references by replacing a base symbol in a shared reference expression with a new local pointer, by replacing an original induction variable with a new induction variable, and by replacing the induction variable for a higher dimension with a value of zero (0). Local shared references in a longest list of hash entries, including lists of hashed local shared references having a constant access stride after being rewritten, are privatized.

The calculator 416 provides a capability for computing new upper bound and lower bound values as well as original induction variable values. The dead store eliminator 418 provides a cleaning capability to remove any unnecessary expressions (e.g., code) as a result of the transformation process. Control flow information and data flow information is rebuilt after operation of the cleaning operation of the dead store eliminator 418.

FIG. 5 is a flowchart of an example of an implementation of a upc_forall loop transformation process 500. The process 500 is an example of a upc_forall loop transformation that may be implemented using the loop transformation system 400 of FIG. 4.

A high-level overview of the process 500 may be described using the following example pseudo code snippet:

```
Normalize_UPC_FORALL_LOOP( ){
    build control flow and data flow;
    do locality analysis, put shared reference and related information into
            shared reference map;
    for every loop, do {
        skip if the loop is not a upc_forall loop;
        for each shared reference in this loop, do {
            skip if the shared reference is not local;
            skip if the shared reference doesn't have constant stride
                    and blocking_factor % stride !=0;
            hash the local shared references into a hash table,
                where each hash table entry is a list and a local
                shared reference that has the same characteristics
                will be added into the same list;
        }
        pick the longest hash table entry LA;
        for every local shared reference in LA, do {
            PrivatizeSharedReference( );
        }
        RewriteUPCForallLoop( );
    }
    Do dead store elemination;
    Build control flow and data flow;
}
```

Using the previous example pseudo code snippet as an example, the process 500 begins (step 502) and builds control flow information and data flow information for a program containing a respective upc_forall loop of interest (step 504). The process 500 performs locality analysis using the control flow information and the data flow information associated with the program containing the upc_forall loop, which creates and places all the shared access and associated locality information into a shared reference map data structure (step 506).

For each unprocessed upc_forall loop, the process 500 hashes each local shared access whose access stride is constant after being rewritten (step 508). Each hash entry is a list in which local shared references, which have the same characteristics, are added into the list of the same entry. A hash entry having a longest list is selected and all the local shared references in that list are privatized, leaving remaining shared references untouched (step 510).

An example detailed sub-process of step 510 to privatize a local shared reference is represented within the following example pseudo code snippet. A local pointer is initialized first and inserted in an outermost position of the respective upc_forall loop for each interested shared array. The original induction variable (CIV) is replaced with a new induction variable (NCIV). Replacing the induction variable for the higher dimension with a value of zero (0) eliminates the higher dimension in the original shared reference expression.

```
PrivatizeSharedReference( ){
    Insert the initialization of local pointer localPtr at the very
        beginning;
    Replace the base symbol of the shared reference expression with
        localPtr;
    Replace the original induction variable CIV with NCIV;
    Get rid of the higher dimension in shared reference expression;
}
```

The process 500 rewrites the original respective upc_forall loop to a for loop (step 512). An example detailed sub-process of step 512 to rewrite the original respective upc_forall loop is represented within the following example pseudo code snippet:

```
RewriteUPCForallLoop( ){
    linearize original lower bound and upper bound of the upc_forall
        loop;
    insert the new lower bound calculation outside the upc_forall loop;
    insert the new upper bound calculation outside the upc_forall loop;
    insert the original induction variable calculation inside the upc_forall
        loop;
    change upc_forall loop to for loop with new lower bound, new upper
        bound and new induction variable;
}
```

The process 500 linearizes the lower bound and upper bound of the upc_forall loop, which treats a multi-dimension array as a one-dimension array, where a corresponding linear index in the one-dimension array for each of the old lower bound and the old upper bound are the linearized lower bound and linearized upper bound, respectively. The new lower bound and new upper bound calculation using the linearized lower bound and linearized upper bound are inserted right before the respective upc_forall loop. The original induction variable calculation (using the new induction variable) is inserted inside the respective upc_forall loop before the first statement of the respective upc_forall loop because a non-local shared reference or private reference may still use the original induction variable. The respective upc_forall loop is accordingly rewritten into a for loop having a new lower bound, a new upper bound, and a new induction variable.

The process 500 calculates the new lower bound, the new upper bound, and the original induction variable using a set of sub-processes represented by the following example pseudo code snippet. The sub-process to compute the new lower bound and the new upper bound are the same (e.g., equivalent). To calculate a new bound correctly, the sub-process uses the values of the linearized old bound, a blocking factor, and a lower dimension size. The calculations will be in-lined, and even though the calculations also contain mathematical operations (e.g., multiplication "*" and division "I" operations), the calculations are outside the original respective loop.

```
int ComputeNewBound(linearized _old_bound, blocking_factor,
lower_dimension_size){
        int comU,remU, newU;
        if (blocking_factor == 0) {
            if (MYTHREAD == 0) newU = linearized _old_bound;
            else newU = 0;
        } else {
            comU =
                blocking_factor * (linearized _old_bound /
                (THREADS *blocking_factor));
            remU = linearized _old_bound – comU * THREADS;
            newU = comU + ( remU >= ((MYTHREAD+1) *
            blocking_factor) ?
                blocking_factor: (remU >= MYTHREAD
                *blocking_factor ) ? (remU –
                MYTHREAD *blocking_factor ): 0 );
        }
        return (newU / lower_dimension_size);
}
```

A detailed sub-process to compute the original induction variable is shown in the following example pseudo code snippet. This calculation uses values for the linearized new induction variable, a blocking factor, a lower dimension size, and linearized old lower bound. The calculation will also be in-lined. The calculation is inserted inside the original respective loop. However, the inserted calculation may be deleted by dead store elimination (of step 516) when the code is not referenced by other references inside the respective loop after privatization.

```
int ComputeOldCIV (linearized_new_civ, blocking_factor,
        lower_dimension_size, linearized _old_lower_bound) {
    int civ;
    civ = linearized_new_civ + MYTHREAD * blocking_factor +
        linearized_new_civ / blocking_factor * blocking_factor *
        ( THREADS- 1 );
    return ((civ - linearized _lower_bound)/lower_dimension_size );
}
```

The process 500 determines whether an unprocessed upc_forall loop exists (step 514). Responsive to a determination that an unprocessed upc_forall loop exists, the process 500 loops back to perform step 508 as before and iterates as described above. Responsive to a determination that no unprocessed upc_forall loop exists, the process 500 runs dead store elimination (step 516). The process 500 rebuilds the control flow information and the data flow information for the program containing the for loop (step 518) and terminates thereafter (step 520).

Thus is presented in one illustrative example a computer-implemented process for upc_forall loop transformation. The computer-implemented process builds control flow information and data flow information, creates a shared reference map data structure using the control flow information and data flow information, hashes all local shared access having a constant access stride after being rewritten, privatizes all local shared references in a hash entry having a longest list, and rewrites the respective upc_forall loop into a for loop. Responsive to a determination that an unprocessed upc_forall loop does not exist, the computer-implemented process runs dead store elimination, and rebuilds control flow information and data flow information associated with the program containing the for loop.

The flowchart and block diagrams in the figures illustrate examples of architecture, functionality, and operation of possible implementations of systems, methods, and computer program products according to various embodiments of the present subject matter. In this regard, each block in the flowchart or block diagrams may represent a module, segment, or portion of code that includes one or more executable instructions for implementing a specified logical function. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present technology has been presented for purposes of illustration and description, but is not intended to be exhaustive or limited to the present subject matter in the form disclosed. Many modifications and variations will be apparent to those of ordinary skill in the art in consideration of the teachings herein without departing from the scope and spirit of the present subject matter. The examples herein were chosen and described to explain the principles of the invention and the practical application, and to enable others of ordinary skill in the art to understand the present subject matter for various embodiments with various modifications as are suited to the particular use contemplated.

The invention may take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art in consideration of the teachings herein.

It should be noted that while the present subject matter has been described in the context of a fully functioning data processing system, those of ordinary skill in the art will appreciate in consideration of the teachings herein that the processes of the present subject matter are capable of being distributed in the form of a computer readable storage medium of instructions and a variety of forms and that the present subject matter applies equally regardless of the particular type of storage bearing media actually used to carry out the distribution. Examples of computer readable storage media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

What is claimed is:

1. A computer-implemented process for upc_forall loop transformation, comprising:
    hashing only local shared accesses with a constant access stride after being rewritten;
    transforming a upc_forall loop into a single for loop with a new induction variable that operates without a guard statement; and
    transforming all local shared references in a hash entry with a longest list into privatized local pointer accesses that use an affine expression comprising linear access indexes derived from the new induction variable of the single for loop.

2. The computer-implemented process of claim 1, further comprising:
    building control flow information and data flow information associated with a program containing the upc_forall loop; and
    creating a shared reference map data structure using the control flow information and the data flow information comprising:
        performing locality analysis using the control flow information and the data flow information associated with the program containing the upc_forall loop; and
        placing all shared access and associated locality information into the shared reference map data structure.

3. The computer-implemented process of claim 1, where hashing only the local shared accesses with the constant access stride after being rewritten comprises:
    hashing each local shared access with the constant access stride, where each hash entry is a list in which local shared references with same characteristics are added into the list of a same entry; and
    identifying the hash entry with the longest list.

4. The computer-implemented process of claim 1, where transforming all local shared references in the hash entry with the longest list into the privatized local pointer accesses that use the affine expression comprising the linear access indexes derived from the new induction variable of the single for loop comprises:
    inserting initialization of a local pointer at an outermost position of the upc_forall loop for each shared array processed;
    replacing a base symbol of a shared reference expression with the local pointer;
    replacing an original induction variable with the new induction variable; and
    eliminating a higher dimension in the shared reference expression, where remaining shared references are left untouched.

5. The computer-implemented process of claim 1, where transforming the upc_forall loop into the single for loop with the new induction variable that operates without the guard statement comprises:

linearizing an original lower bound and an upper bound of the upc_forall loop;

inserting a new lower bound calculation outside the upc_forall loop;

inserting a new upper bound calculation outside the upc_forall loop;

inserting an original induction variable calculation inside the upc_forall loop; and changing the upc_forall loop into the single for loop with the new lower bound, the new upper bound, and the new induction variable.

6. The computer-implemented process of claim 5, where inserting the new lower bound calculation outside the upc_forall loop, inserting the new upper bound calculation outside the upc_forall loop, and inserting the original induction variable calculation inside the upc_forall loop comprises:

performing the new lower bound calculation, the new upper bound calculation, and the original induction variable calculation, where a sub-process for the new lower bound calculation and the new upper bound calculation are equivalent, using values of a linearized old bound, a blocking factor, and a lower dimension size; and in-lining the calculations, where the calculations are outside the upc_forall loop.

7. The computer-implemented process of claim 5, where inserting the original induction variable calculation inside the upc_forall loop comprises:

performing the original induction variable calculation using values for a linearized new induction variable, a blocking factor, a lower dimension size, and a linearized old lower bound; and in-lining the calculation inside the single for loop.

8. A computer program product for upc_forall loop transformation, comprising a non-transitory computer recordable-type media containing computer executable program code stored thereon, where the computer executable program code when executed on a computer causes the computer to:

hash only local shared accesses with a constant access stride after being rewritten;

transform a upc_forall loop into a single for loop with a new induction variable that operates without a guard statement; and transform all local shared references in a hash entry with a longest list into privatized local pointer accesses that use an affine expression comprising linear access indexes derived from the new induction variable of the single for loop.

9. The computer program product of claim 8, where the computer executable program code when executed on the computer further causes the computer to:

build control flow information and data flow information associated with a program containing the upc_forall loop; and create a shared reference map data structure using the control flow information and the data flow information, comprising causing the computer to:

perform locality analysis using the control flow information and the data flow information associated with the program containing the upc_forall loop; and place all shared access and associated locality information into the shared reference map data structure.

10. The computer program product of claim 8, where, in causing the computer to hash only the local shared accesses with the constant access stride after being rewritten, the computer executable program code when executed on the computer causes the computer to:

hash each local shared access with the constant access stride, where each hash entry is a list in which local shared references with same characteristics are added into the list of a same entry; and identify the hash entry with the longest list.

11. The computer program product of claim 8, where, in causing the computer to transform all local shared references in the hash entry with the longest list into the privatized local pointer accesses that use the affine expression comprising the linear access indexes derived from the new induction variable of the single for loop, the computer executable program code when executed on the computer causes the computer to:

insert initialization of a local pointer at an outermost position of the upc_forall loop for each shared array processed;

replace a base symbol of a shared reference expression with the local pointer;

replace an original induction variable with the new induction variable; and eliminate a higher dimension in the shared reference expression, where remaining shared references are left untouched.

12. The computer program product of claim 8, where, in causing the computer to transform the upc_forall loop into the single for loop with the new induction variable that operates without the guard statement, the computer executable program code when executed on the computer causes the computer to:

linearize an original lower bound and an upper bound of the upc_forall loop;

insert a new lower bound calculation outside the upc_forall loop;

insert a new upper bound calculation outside the upc_forall loop;

insert an original induction variable calculation inside the upc_forall loop; and change the upc_forall loop into the single for loop with the new lower bound, the new upper bound, and the new induction variable.

13. The computer program product of claim 12, where, in causing the computer to insert the new lower bound calculation outside the upc_forall loop, insert the new upper bound calculation outside the upc_forall loop, and insert the original induction variable calculation inside the upc_forall loop, the computer executable program code when executed on the computer causes the computer to:

perform the new lower bound calculation, the new upper bound calculation, and the original induction variable calculation, where a sub-process to for the new lower bound calculation and the new upper bound calculation are equivalent, using values of a linearized old bound, a blocking factor and a lower dimension size; and in-line the calculations, where the calculations are outside the upc_forall loop.

14. The computer program product of claim 12, where, in causing the computer to insert the original induction variable calculation inside the upc_forall loop, the computer executable program code when executed on the computer causes the computer to:

perform the original induction variable calculation using values for a linearized new induction variable, a blocking factor, a lower dimension size, and a linearized old lower bound; and in-line the calculation inside the single for loop.

15. An apparatus for upc_forall loop transformation, comprising:
a processor programmed to:
hash only local shared accesses with a constant access stride after being rewritten;
transform a upc_forall loop into a single for loop with a new induction variable that operates without a guard statement; and
transform all local shared references in a hash entry with a longest list into privatized local pointer accesses that use an affine expression comprising linear access indexes derived from the new induction variable of the single for loop.

16. The apparatus of claim 15, where the processor is further programmed to:
build control flow information and data flow information associated with a program containing the upc_forall loop; and
create a shared reference map data structure using the control flow information and the data flow information comprising being programmed to:
perform locality analysis using the control flow information and the data flow information associated with the upc_forall loop; and
place all shared access and associated locality information into the shared reference map data structure.

17. The apparatus of claim 15, where, in being programmed to hash only the local shared accesses with the constant access stride after being rewritten, the processor is programmed to:
hash each local shared access with the constant access stride, where each hash entry is a list in which local shared references with same characteristics are added into the list of a same entry; and
identify the hash entry with the longest list.

18. The apparatus of claim 15, where, in being programmed to transform all local shared references in the hash entry having the longest list into the privatized local pointer accesses that use the affine expression comprising the linear access indexes derived from the new induction variable of the single for loop, the processor is programmed to:

insert initialization of a local pointer at an outermost position of the upc_forall loop for each shared array processed;
replace a base symbol of a shared reference expression with the local pointer;
replace an original induction variable with the new induction variable; and
eliminate a higher dimension in the shared reference expression, where remaining shared references are left untouched.

19. The apparatus of claim 15 where, in being programmed to transform the upc_forall loop into the single for loop with the new induction variable that operates without the guard statement, the processor is programmed to:
linearize an original lower bound and an upper bound of the upc_forall loop;
insert a new lower bound calculation outside the upc_forall loop;
insert a new upper bound calculation outside the upc_forall loop;
insert an original induction variable calculation inside the upc_forall loop; and
change the upc_forall loop into the single for loop with the new lower bound, the new upper bound, and the new induction variable.

20. The apparatus of claim 19 where, in being programmed to insert the new lower bound calculation outside the upc_forall loop, insert the new upper bound calculation outside the upc_forall loop, and insert the original induction variable calculation inside the upc_forall loop, the processor is programmed to:
perform the new lower bound calculation, the new upper bound calculation, and the original induction variable calculation, where a sub-process for the new lower bound calculation and the new upper bound calculation are equivalent, using values of a linearized old bound, a blocking factor, and a lower dimension size; and
in-line the calculations, where the calculations are outside the upc_forall loop.

* * * * *